3,060,699
CONDENSER PRESSURE REGULATING SYSTEM
Ralph B. Tilney, St. Louis, Mo., assignor to Alco Valve Company, St. Louis, Mo., a corporation of Missouri
Filed Oct. 1, 1959, Ser. No. 843,819
14 Claims. (Cl. 62—196)

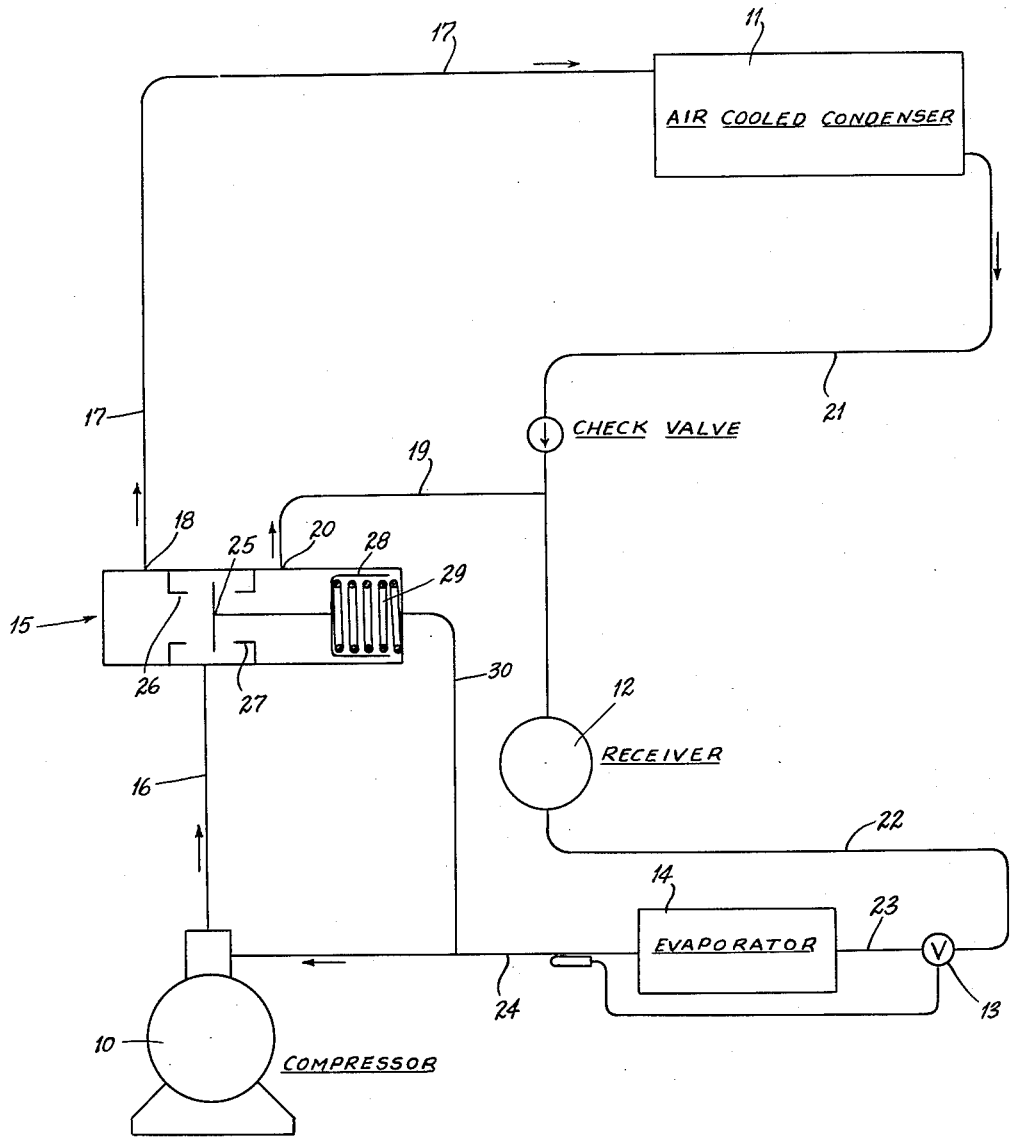

This invention relates to refrigeration apparatus, and more particularly to a novel control for regulating the flow of cooling fluid through a condenser as determined by the pressure differential between the high and low sides of the refrigerating system.

The present invention is concerned primarily with those refrigeration systems having a condenser which is subjected to variations in ambient temperature. Such a condenser would be for instance of the air-cooled type which is located outside, and is subjected to cold weather conditions. The principal object of the invention is to control the cooling fluid flow through such a condenser whereby there will be an efficient operation of the refrigeration system even in extremely cold climatary conditions.

A specific object of the invention is to provide a flow control in a refrigeration system for bypassing the flow of refrigerant across rather than through the condenser as determined by the pressure differential between the high and low pressure sides of the system. According to the invention, therefore, there is a conventional three-way valve inserted into the refrigeration system between the compressor and the condenser. There is a high-pressure inlet to the valve from the compressor, and two outlets from the valve: one to the condenser and one bypassing the condenser leading directly into the receiver. The valve is spring-urged in a direction tending to close off the outlet to the condenser. The valve piston is also connected to the low pressure side of the system (following the evaporator), and this low pressure into the valve aids the previously-mentioned spring in tending to close the outlet to the condenser. The force tending to close the outlet to the bypass line, and therefore open the outlet to the condenser, is the pressure in the condenser, itself. Thus it can be seen that the system changes which will affect the position of the valve are the pressure in the condenser compared to the pressure out of the evaporator, and the difference must be such that the valve will open toward the condenser before fluid will pass through the condenser. The valve will also modulate through various ranges of the above-described pressure differential.

A special object of the present invention is to provide a pressure differential control for regulating the flow of fluid through the condenser of a refrigeration system wherein the control is effectively determined by the pressure drop across the expansion device. Since the pressure through the condenser remains substantially constant, and likewise through the evaporator remains substantially constant, the pressure differential which is measured and which controls the operation of the valve is quite accurately the pressure drop across the expansion device. Inasmuch as it is the expansion valve which determines the proper functioning of the evaporator, the importance of this object will be readily appreciated.

A further object of the present invention is to provide a valve for controlling the passage of fluid through a condenser which is not subject to fatigue-like problems. This object is accomplished by the provision of a valve which does not rely upon hermetic sealing of the valve element, and which is therefore not subject to fatigue failure under the variety of high-pressure conditions and severe pressure discharge pressure pulsations.

Another object of the invention is to provide a piston-operated valve which is not limited in stroke, so that all size valves may be directly operated without the necessity for a pilot valve on large-size installations.

Still another object of the invention is to provide an improved means for effecting hot gas defrosting of the evaporator.

Other objects and advantages will be apparent from the more detailed description of the invention to follow.

The drawing is a schematic illustration of the invention showing a preferred valve arrangement positioned between the compressor and condenser, with a bypass line connected after the condenser.

The refrigeration system is comprised of the usual components, namely, a compressor 10, a condenser 11, a receiver 12, an expansion device 13 and an evaporator 14. The valve toward which this invention is directed is indicated at numeral 15.

There is a pipe 16 connecting from the compressor to the high-pressure input side of the valve 15. A pipe 17 connects from one outlet 18 of the valve to the condenser 11. Another pipe 19 connects from the other outlet 20 of the valve 15 to a pipe 21, which latter pipe connects the condenser and the receiver 12.

A pipe 22 connects the receiver to the expansion device 13, and another pipe 23 connects the expansion device 13 to the evaporator 14. The evaporator 14 is connected to the input side of the compressor by a pipe 24.

Referring to the valve 15, it can be seen that the valve is illustrated as comprising a single, double-faced piston 25 adapted to alternately close on opposed valve seats 26 and 27. An imperforate cup 28 is connected to one end of the piston 25. A compression spring 29 tends to bias the piston 25 against the left-hand seat 26 (which may be called the condenser seat). The end of the valve 15 having the cup 28 is also connected by a pipe 30 to the low-pressure side of the system, that is to the pipe 24 following the evaporator 14.

In the operation of the system, the compressor feeds the refrigerant at a high pressure, in a conventional manner, toward the valve 15. If the temperature in the condenser is sufficiently high, the pressure attendant that temperature in the pipe 17 will be higher than the forces of the spring 29 and the low pressure in the pipe 30. This will cause the piston 25 to seat upon the bypass seat 27, closing the bypass line 19 so that all of the refrigerant will pass through the pipe 17 to the condenser. Under these conditions, the operation of the system is conventional. The condensed refrigerant is expanded in the expansion device and then is passed through the evaporator, thereby cooling the air which passes across the evaporator.

The expansion device can properly operate only if there is a sufficient pressure applied to its input. This pressure will not be adequate of ithe condenser is cooled to such a low temperature that its pressure is extremely low. In addition to the lack of sufficient driving pressure across the valve, there may be sufficient temperature rise through the pipe 21 leading from the condenser to the expansion device that vaporizing of the refrigerant takes place before it reaches the expansion valve. This vapor occupies a considerably larger volume than the liquid refrigerant from the condenser and upsets the operation of the expansion device upon the liquid refrigerant. The purpose of the bypass pipe 19, therefore, is to permit the refrigerant to bypass the condenser when the pressure in the condenser is so low as to create the above-mentioned problems.

Opposing the force of the pressure in the pipe 17 which tends to move the piston 25 to the right against the bypass seat 27 is the combined force of the spring 29 and the pressure in the pipe 30. Since the pipe 30 is connected to the low-pressure side of the system following the evaporator (and the expansion valve), the pressure in that pipe will always be low. Under normal operating conditions, the pressure in the pipe 17 will be sufficiently high to overcome the combined pressures of the spring 29 and the pipe 30 to maintain the piston 25 seated upon the right side (bypass) valve seat 27. However, in conditions of low ambient temperature whereby the temperature of the refrigerant within the condenser is lowered below a predetermined critical value, the pressure in the pipe 17 will drop. If the pressure drop in the pipe 17 is below the pressures of the spring 29 and the pipe 30, the piston 25 will move to the left toward the seat 26. In that case, refrigerant can flow through the bypass line across the expansion valve and through the compressor without passing through the condenser.

Of course, all positions of the valve between the condenser and bypass seats are possible. In fact, the valve will always modulate until it reaches a condition of pressure balance. Thus there may be many operating conditions under which there will be flow both through the condenser and through the line bypassing it.

Various changes and modifications may be made in this invention as will be readily apparent to those skilled in the art. Such changes and modifications are within the scope and teaching of this invention as defined by the claims appended.

What is claimed is:

1. In a refrigeration system having a compressor, a condenser, a receiver, an expansion device and an evaporator piped in series, a bypass connected between the inlet and outlet sides of the condenser, above the expansion device, control means for sensing the pressure drop between a point upstream of, and a point downstream of the expansion device, and apparatus including valve means operated by the sensing means for regulating the flow of refrigerant through the bypass and the condenser in proportion to that pressure drop.

2. In a refrigeration system having a compressor, a condenser, an expansion device, a receiver, and an evaporator piped in series, a valve housing connected in the inlet pipe between the compressor and the condenser and having a pipe connected from the inlet to the outlet side of the condenser above the expansion device for bypassing the condenser, valve means in the valve housing movable to extreme positions for alternatively blocking the flow of refrigerant to the compressor and to the bypass pipe, movable between the extreme positions for restricting the flow to both in various proportions, and pressure-responsive means operating the valve means according to the pressure drop between points upstream and downstream of the expansion device.

3. In a refrigeration system having a compressor, a condenser, a receiver, an expansion device and an evaporated piped in series; a valve housing having an inlet connected to the pipe from the compressor, a first outlet connected to the inlet pipe to the condenser and a first valve seat between the inlet and the first outlet; said valve further having a second outlet connected to the pipe from the condenser outlet above the expansion device, and a second valve seat between the inlet and the second outlet; a valve between the seats, a piston connected to the valve to more it between the seats and into positions selecively sealing each one of the valve outlets from the valve inlet; the opposite sides of said piston being connected to receive pressures from points respectively above and below the expansion device.

4. A refrigerant flow system for use in series closed circuit with a compressor comprising a condenser having an inlet and having an outlet, piped to a receiver and an expansion device, the expansion device being piped to an evaporator, the evaporator having an outlet adapted for connection with a compressor, there being one pipe connected from the compressor to the condenser inlet and a second pipe connected to the condenser outlet above the expansion device, valve means to regulate the relative rates of flow through said latter two pipes, valve operating means including pressure responsive means connected across the expansion device, to move in response to pressure drop thereacross, and means connecting the valve operating means to the valve.

5. In a refrigeration system having a compressor, a condenser, a receiver, an expansion device and an evaporator, piped in series and a bypass between the inlet side and the outlet side of the condenser: a method for regulating the rate of flow through the condenser which comprises the steps of sensing the pressure drop of refrigerant between points upstream and downstream of the expansion device to produce movement of a device, in response to changes in such pressure drop, and employing the movement of the device for directing flow through the bypass, and for restricting the flow of fluid through the condenser in proportion to decreases in the pressure drop sensed.

6. In a refrigeration system of the type having a compressor, a condenser, a receiver, an expansion device, and an evaporator connected in a closed series circuit, a bypass pipe from an inlet pipe into the condenser to the outlet side of the condenser upstream of the expansion device whereby refrigerant fluid may flow through the condenser and fluid may bypass the same; valve means for controlling flow of the refrigerant to increase the proportion of refrigerant bypassing the condenser to that flowing through it, whereby to effect decrease in condensing capacity of the condenser and maintenance of condenser pressure; and pressure-responsive means oppositely connected to points in the circuit above and below the expansion device to position the valve means as opposite functions of pressure upstream of the expansion device and pressure downstream thereof, the pressure-responsive means positioning the valve to increase the flow through the condenser upon increase of pressure upstream of the expansion device.

7. In a refrigeration system of the type having a compressor, a condenser, a receiver, an expansion device, and an evaporator connected in a closed series circuit, a bypass pipe from an inlet pipe into the condenser to the outlet side of the condenser upstream of the expansion device whereby refrigerant fluid may flow through the condenser and fluid may bypass the same; valve means controlling flow of refrigerant through at least one of the said pipes, pressure-responsive means movable to position the valve means, the pressure-responsive means being moved in one direction in response to rise in pressure upstream of the expansion device, and being moved in the opposite direction in response to rise in pressure downstream of the expansion device; the pressure-responsive means being connected with the valve means to cause decrease in flow of refrigerant through the condenser inlet pipe when the pressure upstream of the expansion device declines.

8. The system of claim 7, wherein the pressure-responsive means is a cylinder and a piston freely movable therein, one side of the piston being piped into the suction line below the evaporator, and the other side being exposed to condenser pressure.

9. A control system for a refrigeration circuit comprising a compressor, a condenser, a receiver, an expansion device, and an evaporator all piped in a closed series refrigerant circuit; a bypass pipe to conduct refrigerant around the condenser; valve means to reduce the refrigerant flow into the condenser during operation of the compressor, and pressure-responsive means to operate the valve, including a movable wall subjected on one side to a pressure corresponding to condenser pressure, to operate the valve means to reduce refrigerant flow to the condenser when condenser pressure falls, means connecting the opposite side of the wall to receive a pressure corresponding to evaporator outlet pressure, and yieldable force means acting on the wall in the same direction as evaporator pressure.

10. The system of claim 9, wherein the valve means and its operating means comprise a valve housing having the movable wall therein in the form of a freely movable piston.

11. The system of claim 3 wherein there is a yieldable force means acting to urge the valve away from the second seat.

12. The combination of claim 4 wherein there is a housing containing the valve means and the valve-operating means, and wherein the last is a slidable piston.

13. The combination of claim 4, wherein the valve-operating means includes a movable wall subjected on one side to means to increase flow to the condenser on rise of pressures corresponding to condenser pressures acting to move the valve, and on the other side to pressures corresponding to evaporator pressures, and includes a yieldable force means acting in opposition to the pressures on the one side of the wall as aforesaid.

14. In a refrigeration system having a compressor, a condenser, a receiver, an expansion device and an evaporator piped in a closed series; a bypass around the condenser; valve means to proportion flow between the condenser and bypass; pressure responsive valve operating means operable in response to a predetermined difference in pressure upstream and downstream of the evaporator; and means connecting the valve operating means to the valve means to cause the valve to move in response to the said pressure difference and to bypass the condenser to maintain a predetermined minimum difference in pressure between a point upstream of the expansion valve and a point downstream thereof.

References Cited in the file of this patent

UNITED STATES PATENTS

| | | |
|---|---|---|
| 2,080,288 | McCormack | May 11, 1937 |
| 2,869,330 | Kramer | Jan. 20, 1959 |
| 2,926,503 | Neubauer | Mar. 1, 1960 |
| 2,954,681 | McCormack | Oct. 4, 1960 |